United States Patent Office 3,371,037
Patented Feb. 27, 1968

3,371,037
DRILLING FLUIDS AND ADDITIVES THEREFOR
Donald O. Hitzman, Bartlesville, Okla., assignor to Phillips Petroleum Company, a corporation of Delaware
No Drawing. Filed July 1, 1964, Ser. No. 379,700
17 Claims. (Cl. 252—8.5)

ABSTRACT OF THE DISCLOSURE

New additive agents for drilling fluids, which agents comprise a water dispersible starch or a water dispersible gum and iodine. Stabilizing agents such as water, a water soluble organic solvent, or an alkali metal iodide can also be incorporated in said additive agents. Said additive agents can be used in aqueous drilling fluids to control water loss therefrom, as when said drilling fluids are used in the drilling of wells.

---

This invention relates to drilling fluids and additives therefor. In one aspect this invention relates to additives for drilling fluids which when added to said drilling fluids improves the water loss properties of said drilling fluid. In another aspect this invention relates to methods of using said improved drilling fluids in the drilling of wells.

In the art of drilling wells to tap subterranean deposits of fluids such as oil and/or gas, especially when drilling by the rotary method employing a rotary bit and drill stem, a drilling fluid, usually a compounded fluid made to predetermined physical and chemical properties, is circulated to the bottom of the bore hole, out through openings in the bit at the bottom of the bore hole, and then back up said bore hole to the surface by passage through the annular space between said drill stem and the wall of said bore hole (or between said drill stem and the wall of the casing where casing has been put in place).

The drilling fluid must act as a liquid medium of controlled viscosity for removing cuttings from the bore hole; it must prevent excessive amounts of fluid from flowing from the bore hole into surrounding formations by depositing on the wall of the hole a thin but substantially impervious filter cake; it must possess a gel structure of sufficient strength to hold in suspension solids, particularly during any time the fluid is not circulating; it must serve as a weighting material exerting sufficient pressure to counterbalance any pressure exerted by water, gas, oil, or other fluid from a penetrated structure and to prevent caving or other intrusion into the drill hole. Said drilling fluid must also serve as a lubricant for the bearings of the drill bit and the cutting surface of the bit teeth, and to reduce frictional forces on the drill pipe.

These requirements have been met in the past by employing both aqueous or water base and non-aqueous or oil base drilling fluids. The aqueous drilling fluids normally comprise water, finely divided inorganic materials such as various types of clays and clayey materials, and weighting materials suspended in the water. The non-aqueous or oil base drilling fluids normally comprise a non-aqueous liquid such as crude oil or a petroleum distillate, and a weighting material which can be a clay or other suitable material. In addition to aqeuous and non-aqueous drilling fluids as defined above, emulsion-type drilling fluids are often used. These emulsion drilling fluids normally comprise a substantially water-insoluble liquid such as oil, a finely divided inorganic material such as clay, and water, together with a suitable dispersing or emulsifying agent. The two types of emulsion drilling fluids are the oil-in-water emulsion type, sometimes referred to as water base emulsion type, and the water-in-oil emulsion type, sometimes referred to as oil base emulsion type. In the latter, oil forms the continuous phase of the emulsion, and in the former, water or brine forms the continuous phase of the emulsion.

One of the primary difficulties encountered in the drilling of the wells is the tendency of the drilling fluid to lose water to the formations penetrated. To this end, starchy or amylaceous material, such as gelatinized starch, is commonly incorporated in the aqueous drilling fluid to decrease the loss of water from the drilling fluid, in addition to aiding the formation of a filter cake on the wall of the well. The starch may be obtained from any suitable source such as wheat, corn, potato, soya bean, sago, tapioca, arrowroot, canna, amioca (waxy maize), yucca, etc., all of which are amylaceous colloids or starchy colloids. These starch additives are prepared by methods well known in the art and these methods need not be detailed here. When so gelatinized as by cooking or boiling with water, said starch additives become readily water dispersible.

The water dispersible gums are also used to some extent in drilling fluids as water loss control additives. Included among said water dispersible gums are the naturally occurring plant gums such as gum ghatti, gum arabic, gum tragacanth, locust bean gum, the various seaweed gums, gum karaya, jungle gum, and others. Also included among said water dispersible gums are the so-called synthetic gums such as gum dextran synthesized by the action of the bacterium known as genus Leuconostoc Van Tieghem emend on sucrose, as described by Bailey et al. in Patent No. 2,360,327; phosphorylated mannan synthesized by the action of the yeast *Hansenula holstii* NRRL Y–2448 on glucose as described in United States Department of Agriculture, Agricultural Research Service, Northern Utilization Research and Development Division, Peoria, Illinois, Bulletin CA–N–7, October 1958; and polysaccharide B–1459 synthesized by the action of the bacterium *Xanthomonas campestris* NRRL B–1459 on glucose as described in United States Department of Agriculture, Agricultural Research Service, Northern Utilization Research and Development Division, Peoria, Illinois, Bulletin CA–N–9, September 1959. For convenience, the term "water dispersible gums" is employed generically herein and in the claims to refer to and include both said natural and said synthetic gums.

The efficiency of said water dispersible starch additives and said water dispersible gum additives to decrease the water loss of the drilling fluids to which they are added is seriously curtailed by the degradation of these additives in the presence of microorganisms commonly present in the drilling fluids. As degradation progresses during the course of drilling, the water loss properties of the drilling fluids increase, carbon dioxide is evolved and causes foam, and the drilling fluids have disagreeable odors. The degradation or fermentation of the additives can generally be prevented by maintaining in the drilling fluid a high salt concentration, about 15 percent, or a relatively high pH, about 12. However, these procedures do not always effectively inhibit the degradation and are often expensive. Commonly accepted bactericidal agents such as bichloride of mercury, copper sulfate and quaternary ammonium compounds have been found generally satisfactory in starch preservative drilling fluids.

I have now found that the undesirable fermentation or degradation of polysaccharides such as said water dispersible starches and water dispersible gums can be inhibited by iodination thereof with elemental iodine. It is well known that elemental iodine forms some sort of complex with starchy materials. The exact nature of said complex is unknown. It was surprising and unexpected that the complexing of iodine with starchy materials does not destroy the water loss control properties of said starchy materials.

One presently preferred additive in accordance with the invention comprises a mixture of at least one of said water dispersible starches and said water dispersible gums with elemental iodine and which mixture has been stabilized with an organic solvent which is a solvent for iodine. Said mixture comprises a new composition of matter.

Thus, broadly speaking, the present invention resides in (a) said new additive composition of matter, (b) new drilling fluid compositions containing an iodinated water dispersible starch and/or an iodinated water dispersible gum, and (c) methods of using said new drilling fluids in the drilling of wells.

An object of this invention is to provide new water loss control additives for well drilling fluids. Another object of this invention is to provide new well drilling fluid compositions. Another object of this invention is to provide new well drilling fluids containing an iodinated water dispersible starch and/or an iodinated water dispersible gum. Another object of this invention is to provide a well drilling fluid containing a water dispersible starch and/or a water dispersible gum, the fermentation and/or degradation of which is effectively inhibited. Another object of this invention is to provide methods of using said improved drilling fluids in the drilling or workover of wells. Another object of this invention is to provide a method of drilling and/or completing a well in which method a drilling fluid of the invention is circulated in said well. Other aspects, objects, and advantages of the invention will be apparent to those skilled in the art in view of this disclosure.

Thus according to the invention, there is provided a new composition of matter, consisting essentially of: A major portion of a comminuted material selected from the group consisting of water dispersible starches, water dispersible gums, and mixtures thereof, mixed with from 0.1 to 5 weight percent of iodine, from 0 to 3 weight percent of an alkali metal iodide, and from 1 to 15 weight percent of an additive stabilizing agent selected from the group consisting of water soluble organic solvents which are solvents for iodine, said weight percentages being based on the weight of said comminuted material.

Further according to the invention, there is provided an aqueous drilling fluid comprising a mixture containing: Water, a small but effective amount, sufficient to improve the fluid loss properties of said drilling fluid but insufficient to increase the viscosity of said drilling fluid to the extent that it cannot be circulated, of a comminuted material selected from the group consisting of water dispersible starches, water dispersible gums, and mixtures thereof; and a small but effective amount of iodine sufficient to inhibit the degradation of said comminuted material.

Still further according to the invention, there are provided methods of using the improved well drilling fluids of the invention, which methods comprise circulating said well drilling fluids into and from the bore hole in contact with the wall of said bore hole.

The iodinated water loss control additives used in the practice of the invention can be produced in any suitable manner. In accordance with one method, a dry starch material and/or a dry gum material is finely divided or comminuted form is dry blended with solid elemental iodine in a high speed mixer (Osterizer). No potassium iodide or other solubilizing agent is required. The light yellowish-tan free free flowing products obtained with low concentrations of iodine give the familiar blue color of the starch-iodine complex when dissolved in water. Although mixtures of other concentrations can be prepared and utilized in the practice of the invention, said invention finds its greatest utility in the use of iodinated water dispersible starches and/or water dispersibe gums which contain iodine in a concentration within the range of from 0.1 to 5, preferably 0.5 to 3, weight percent, based on the weight of said starch or gum. At higher concentrations of about one percent the vaporization of iodine from the mixture becomes undesirably great. This vaporization can be reduced and essentially eliminated, with maintenance of the free flowing character of the iodinated material, by the addition of water up to a maximum of about 15, preferably about 10, weight percent of said iodinated material. Said water serves as a stabilizing agent and stabilizes the iodinated material against loss of iodine vapors. The order of addition of the iodine and water to the water dispersible gum or the water dispersible starch can be as desired. Although ordinarily the iodine is added in the solid phase, and water is added as a liquid, either the iodine or the water can be added in the form of a vapor.

In one presently sometimes preferred embodiment of the invention an organic solvent which is a solvent for iodine is employed as a stabilizing agent for the iodinated material. Any suitable water soluble organic solvent which is chemically inert under the conditions of use can be used for this purpose. Examples of said suitable solvents include methyl alcohol, ethyl alcohol, isopropyl alcohol, the butyl alcohols, acetone, methyl ethyl ketone, and the like. It is not necessary that said organic solvents be completely water soluble. It is preferred, however, that said solvents be sufficiently water soluble in the aqueous phase of the drilling fluid so as to be dissolved and/or readily dispersed therein. When said organic solvents are used in the additives of the invention, they are ordinarily used in amounts within the range of from 1 to 15, preferably 1 to 10, weight percent, based on the weight of the water dispersible starch or water dispersible gum. Since as indicated above, said stabilizing agents are not always required, the over-all range for the concentration of said organic solvent stabilizing agents is from 0 to 15 weight percent based on the amount of the water dispersible starch or water dispersible gum present.

Also, if desired, an alkali metal iodide can be used to stabilize the iodinated additives used in the practice of the invention. As used herein and in the claims, unless otherwise specified, the term "alkali metal" includes sodium, potassium, lithium, rubidium, and cesium. Since the potassium ion and the ions of some of the other alkali metal ions are sometimes detrimental to some mud systems, sodium iodide is the presently preferred alkali metal iodide. Since said alkali metal iodides are not necessary in the practice of the invention, the over-all range in which they are used in accordance with the invention is from 0 to 3, preferably 0 to 0.5, weight percent, based on the amount of water dispersible starch or water dispersible gum present.

The order of mixing of the various above-described ingredients in the water loss control additives used in the practice of the invention is not critical. Any desired order of mixing can be employed. Also, said additives can be mixed at the well site or at some site remote from the well. said additives can be incorporated in the aqueous drilling fluids of the invention in any other suitable manner. Said additives are readily dispersible in water, aqueous solutions, or aqueous emulsions such as oil-in-water emulsions. Thus, the additives can be added to the aqueous drilling fluids as a dispersion in water, a dispersion in an aqueous solution of another additives, or a dispersion in an aqueous emulsion. If desired, said additives can be added directly to the jet hopper commonly employed in formulating drilling fluids. The incorporation of the additives with the drilling fluid can either be before or during the drilling of the well. Also, while it is generally preferred to mix or formulate the additives separately and then incorporate the prepared additive into the drilling fluid, it is within the scope of the invention to incorporate the individual ingredients of the additives into the drilling fluid in the required amounts. It is also within the scope of the invention to "spike" the drilling fluid during use, if necessary or desirable, to maintain the desired concentration of the additive or an ingredient thereof during use. Thus, said additives can be incorporated in the drilling fluids of the invention in any suitable manner and at any suitable time.

The amount of said additives used in drilling fluids in accordance with the invention will vary from well to well depending upon conditions encountered in the drilling or other operations on the well, the characteristics of the particular drilling fluid being used, the formation being drilled, and other factors which can be readily determined by those skilled in the art upon being acquainted with this disclosure. It has long been customary in rotary well drilling operations to subject the drilling fluid to simple routine tests from time to time, and these tests are sufficient to indicate the relative amounts of said additives, water, oil, or other ingredients to be employed in the drilling fluids of the invention.

While therefore the amount of said additives used in the drilling fluids of the invention is not of the essence of the invention, it can be stated that the amount used will normally be within the range of from about 0.5 to 15, preferably 1 to 8, pounds per barrel of drilling fluid. However, it is within the scope of the invention to employ amounts of said additives which are outside said ranges. As used herein and in the claims, unless otherwise specified, the word "barrel" refers to a barrel of 42 standard United States gallons.

The water loss control additives utilized in the practice of the invention can be used in a wide variety of aqueous drilling fluids, e.g., water base drilling fluids and oil-in-water emulsion drilling fluids. In some wells, particularly where hard limestone formations containing no shale or clay are being drilled, the drilling fluid can be water containing only a very small amount of finely divided inorganic solids such as clay solids. Many times the drilling of a well is started with only water as the drilling fluid. As the drilling progresses and shales or clay formations are penetrated, the circulating water will pick up natural clays and become what is commonly referred to as a drilling mud or drilling fluid. In such instances the natural clays can constitute as much as 40 percent by weight of the drilling fluid. More frequently, however, it is desirable to prepare a drilling fluid which is to be used in the drilling by mixing a clayey material such as a natural clay or bentonite with water. If a drilling fluid is thus prepared, the concentration of the clayey material is usually much lower, generally constituting from about 1 to about 15 weight percent of the entire composition. Thus, the drilling fluids of the invention in which the water loss control additives are utilized can contain only relatively small amounts of said clayey materials or can contain said clayey materials in amounts up to about 40 weight percent of the entire composition.

The finely divided inorganic solids used in the drilling fluids increase the viscosity and afford plastering properties to said fluids by aiding the formation of a filter cake on the wall of the bore hole and thus aids in reducing fluid loss to the formations penetrated by said bore hole. While the presence of said solids is desirable initially, it should be pointed out that the drilling fluids of the invention are operable without the initial addition of said solids because a certain solids content will develop during the drilling. The finely divided inorganic solids used in the practice of the invention should be insoluble in the oil phase as well as insoluble in the water phase so that they will remain undissolved over long periods of time. Examples of finely divided solids suitable for use in the practice of the invention include, among others, the following: Bentonite, ground limestone, barites, ground oyster shells, diatomaceous earth, fuller's earth, kaolin, attapulgite, McCracken clay, and other native and/or treated clays. Mixtures of two or more of said finely divided solids can also be used. Some of said materials such as barites and limestone are used primarily as weighting agents. All of said materials are preferably ground until at least about 90 percent will pass through a 325-mesh screen.

A preferred drilling fluid for many drilling operations is an oil-in-water emulsion drilling fluid. These drilling fluids can also contain clay or clayey materials in concentrations ranging from small amounts up to about 40 weight percent. Said oil-in-water emulsion drilling fluids are usually distinguished from water base drilling fluids by their content of from 1 to 40, preferably 3 to 25, weight percent of oil. However, there is really no sharp dividing line between water base drilling fluids and oil-in-water emulsion drilling fluids because water forms the continuous phase in both. Both are frequently referred to as aqueous drilling fluids. Thus, herein and in the claims, unless otherwise specified, the term "aqueous drilling fluid" is used generically and refers to both water base drilling fluids and oil-in-water emulsion drilling fluids.

In an oil-in-water emulsion drilling fluid, the principal value of the oil is as an aid in controlling the density of the drilling fluid and its fluid loss properties. Oils which can be used in the practice of the invention are usually petroleum oils, although other oleaginous materials such as vegetable and animal oils can be used, though seldom with economic advantage. The oils in any event should contain at least some material boiling above the gasoline boiling range, i.e. above about 400° F. at atmospheric pressure. Oils with too high a content of highly volatile hydrocarbons in the gasoline boiling range are undesirable because of the danger of fire, and because of the low viscosity. It is preferred that the oil have a flash point about 140° F. Examples of suitable oils which can be employed in the practice of the invention include, among others, the following: Crude oil, topped crude oil, gas oils, kerosene, diesel fuels, heavy alkylates, fractions of heavy alkylates, heavy fuel oil, various other petroleum fractions, and the like. The more preferred oils are predominantly paraffinic in character since these are less detrimental to rubber components in pumps, lines, etc. It is preferred that the oil have a gravity within the range of 15–40° API.

The aqueous drilling fluids of the invention, both the water base drilling fluids and the oil-in-water emulsion drilling fluids, can contain other additives such as emulsifiers, stabilizers, and thinning agents when required to adjust the properties of the drilling fluids in accordance with conventional practice. Thus, it will be understood that other additives can be added to the drilling fluids of this invention without departing from the scope of the invention. Special materials are oftentimes added to drilling fluids for particular purposes, and such additional materials can be employed in the drilling fluids of this invention, providing a usual and conventional test indicates a lack of obvious adverse reactions, and such additional additives are applicable in the drilling fluids of this invention with few, if any, exceptions.

The other properties, and the tests therefor, which are essential to drilling fluids, such as viscosity, surface tension, gel strength, and absence of foaming, are not significantly affected by the presence of the iodinated water loss control additives in the aqueous drilling fluids of the invention.

The terms "iodination" and "iodinated" as used herein and in the claims in conjunction with the starches and/or gums used in the practice of the invention refer to said starches which have been treated with iodine as described herein.

The fluid or water loss values reported herein were determined in accordance with standard API Code 29 procedures.

Four different laboratory base muds having the following compositions were used in the test runs reported in the examples hereinafter. These muds were:

Base Mud No. 1—3.5 weight percent attapulgite in distilled water.

Base Mud No. 3—3.5 weight percent attapulgite in 5 weight percent salt water.
Base Mud No. 4—3.5 weight percent attapulgite in saturated salt water.
Base Mud No. 5—3.5 weight percent attapulgite in distilled water plus 2 pounds per barrel of gypsum.

Each of said base muds was prepared by adding the ingredients thereof to the required amount of water in a five-gallon jug. The resulting mixture was stirred for two hours with a high-speed mechanical mixer. The jugs were then sealed and the muds aged for seventy-two hours at room temperature. During the last sixteen hours of said aging the jugs were rolled at twenty-seven r.p.m. to insure homogeneity of the muds therein. Aliquot portions of said base muds were then used to prepare sample drilling muds containing various amounts of iodinated additives in accordance with the invention and as described further in the examples given below.

The following examples will serve to further illustrate the invention.

EXAMPLE I

Four samples of iodinated starch were prepared by dry-blending iodine with a commercial oil well starch (Hercules Oil Well Flour) in a high-speed mixer (Osterizer) for one minute. These samples contained iodine in concentrations of 1, 1.5, 2, and 2.5 weight percent, respectively. Then 10 ml. of water was added to each sample, and each mixture was stirred for an additional one minute. The presence of the water substantially eliminated iodine vapor over the iodinated starch. The resulting products ranged in color from a yellow-tan at 1 percent iodine to almost black at 2.5 percent. These products did not change color upon standing on the shelf for 4 months. A sample heated at 80° C. for 2 days did not noticeably lose color.

Each of the iodinated starch samples described above was compared with the untreated starch in several types of drilling muds with regard to water loss and viscosity properties, in a bacterial environment, by standard API Code 29 procedures. To produce the bacterial environment, four drops of an aqueous solution containing a mixed culture of soil organisms representative of those which attack starch during drilling operations were added to each sample of untreated starch or of iodinated starch before its addition to the various mud samples. Said samples of treated and untreated starch were added to the base muds in amounts sufficient to give 4 and 6 lbs. of additive per barrel of starch. Base Muds 1, 3, 4, and 5 (described above) were used in these test runs. Water loss (WL) and pH were determined for each of the inoculated mud samples after aging 80° C. for about 16 hours. In addition, pH and water loss were determined for each of the mud samples after aging 6 days, and after aging 16 days, at room temperature (RT). The data are given in Table I below.

TABLE I

| Run No. | Iodine, wt. Percent in Starch | Aged 16 Hours at 80° C. | | Aged 6 Days at RT | | Aged 16 Days at RT | |
|---|---|---|---|---|---|---|---|
| | | pH | WL, ml./30 min. | pH | WL, ml./30 min. | pH | WL, ml./30 min. |
| Starch—4 lb./bbl. in Base Mud 1 | | | | | | | |
| 1 | 0 | 7.4 | 22.7 | 7.4 | 50 | 7.9 | 116 |
| 2 | 1 | 8 | 15.2 | 7.9 | 39 | 8.1 | 108 |
| 3 | 1.5 | 8 | 15.8 | 7.9 | 17.8 | 7.9 | 57 |
| 4 | 2 | 8 | 18.7 | 7.9 | 23.3 | 7.9 | 81 |
| 5 | 2.5 | 7.8 | 20.5 | 7.4 | 23 | 7.7 | 105 |
| Starch—6 lb./bbl. in Base Mud 1 | | | | | | | |
| 6 | 0 | 8.2 | 11.7 | 8.0 | 31 | 7.2 | 78 |
| 7 | 1 | 8.2 | 10.7 | 8.0 | 15.8 | 7.7 | 49 |
| 8 | 1.5 | 8.1 | 11.1 | 8.0 | 10.4 | 7.9 | 35 |
| 9 | 2 | 8.1 | 14.4 | 8.3 | 11.8 | 7.9 | 74 |
| 10 | 2.5 | 8.0 | 15 | 8.0 | 13 | 8.1 | 76 |
| Starch—4 lb./bbl. in Base Mud 3 | | | | | | | |
| 11 | 0 | 8.4 | 14.8 | 8.4 | 20 | 8.3 | 53 |
| 12 | 1 | 8.4 | 18.6 | 8.3 | 21.4 | 8.0 | 54 |
| 13 | 1.5 | 7.8 | 16 | 8.2 | 29.5 | 8.0 | 98 |
| 14 | 2 | 8.3 | 10.2 | 8.3 | 12 | 8.5 | 57 |
| 15 | 2.5 | 8.3 | 12.6 | 8.4 | 12 | 8.2 | 41 |
| Starch—6 lb./bbl. in Base Mud 3 | | | | | | | |
| 16 | 0 | 8.4 | 8.5 | 8.4 | 8.0 | 8.4 | 77 |
| 17 | 1 | 8.2 | 9.2 | 8.2 | 10.2 | 8.4 | 21 |
| 18 | 1.5 | 8.2 | 7.6 | 8.2 | 8.3 | 7.4 | 21 |
| 19 | 2 | 8.1 | 7.9 | 8.3 | 7.9 | 8.2 | 13 |
| 20 | 2.5 | 8.2 | 7.2 | 8.2 | 7.5 | 8.3 | 13 |
| Starch—4 lb./bbl. in Base Mud 4 | | | | | | | |
| 21 | 0 | 7.9 | 17.5 | 7.8 | 16.0 | 7.9 | 18 |
| 22 | 1 | 8.2 | 17.8 | 8.1 | 16.8 | 8.3 | 18 |
| 23 | 1.5 | 8.2 | 17.9 | 8.1 | 15 | 8.2 | 15.5 |
| 24 | 2 | 8.0 | 16 | 8.1 | 16.2 | 8.3 | 15.5 |
| 25 | 2.5 | 8.0 | 16.7 | 7.7 | 16.3 | 7.9 | 16.0 |
| Starch—6 lb./bbl. in Base Mud 4 | | | | | | | |
| 26 | 0 | 8.3 | 7.1 | 8.3 | 8.5 | 8.2 | 7.6 |
| 27 | 1 | 8.2 | 8.4 | 8.5 | 6.0 | 8.2 | 7.5 |
| 28 | 1.5 | 8.1 | 6.3 | 8.2 | 8 | 8.2 | 8.5 |
| 29 | 2 | 7.8 | 6.4 | 8.2 | 7.7 | 8.0 | 7.8 |
| 30 | 2.5 | 8.1 | 6.0 | 8.2 | 8.8 | 8.1 | 8.0 |
| Starch—4 lb./bbl. in Base Mud 5 | | | | | | | |
| 31 | 0 | 8.1 | 54 | 8.1 | 70 | 7.9 | 117 |
| 32 | 1 | 7.9 | 15.5 | 7.9 | 21.4 | 8.1 | 118 |
| 33 | 1.5 | 7.6 | 11 | 7.4 | 14.5 | 8.1 | 30 |
| 34 | 2 | 7.8 | 12 | 7.9 | 15.5 | 8.1 | 42 |
| 35 | 2.5 | 7.9 | 15.3 | 8.0 | 13 | 8.1 | 44 |
| Starch—6 lb./bbl. in Base Mud 5 | | | | | | | |
| 36 | 0 | 7.9 | 49 | 7.9 | 77 | 7.5 | 94 |
| 37 | 1 | 7.3 | 9.5 | 7.0 | 15.3 | 8.0 | 91 |
| 38 | 1.5 | 7.9 | 7.2 | 7.9 | 8.4 | 8.2 | 15.5 |
| 39 | 2 | 7.9 | 7.0 | 7.9 | 7.8 | 8.1 | 17 |
| 40 | 2.5 | 7.9 | 8.4 | 8.0 | 9.0 | 8.2 | 15.5 |

The above results show that when starch is pretreated with iodine, the iodine protects and extends the water loss control property of the starch. Generally speaking, water loss control in the muds employing the starch containing 1.5 percent iodine was as good as, or better than, that with starch containing higher iodine concentrations. Therefore, a starch containing about 1.5 percent additive appears to be an "optimum additive" in several instances. Of importance was the observation that all of the base muds containing no iodine, with the exception of Base Mud 4, possessed a characteristic disagreeable fermentation odor after aging for 16 days at room temperature. In contrast, all of the muds which contained iodine were essentially free of this fermentation odor after the same period of aging. The high salt concentration in Base Mud 4 protected said mud from fermentation.

EXAMPLE II

A number of test runs were carried out to determine the effects of various iodinated starch additives on the water loss properties of Base Mud No. 1 containing these additives and which had been inoculated with microorganisms. To a large mud sample of about 4000 ml. there was added 10 ml. of an aqueous solution containing a mixed culture of soil organisms representative of those which attack starch during drilling operations. The mud was then divided into a number of aliquot samples. To different ones of said aliquot samples there was mixed an iodinated starch additive prepared by the high-speed mixing of starch (Hercules Oil Well Flour) with (a) iodine; (b) with iodine and water; (c) with iodine and sodium iodide; (d) with iodine, water, and sodium iodide; or (e) with iodine, methanol, and sodium iodide. The mud samples were then tested for water loss properties, initially and after aging at room temperature, by API Code 29 procedures.

For purposes of comparison, water loss properties were also determined for an inoculated mud sample to which was added an additive consisting of the same starch, untreated.

In addition, water loss properties were determined on an inoculated sample of drilling mud to which was added said untreated starch additive and 0.5 g. of paraformaldehyde, a commercial preservative for starch. The water loss data, together with pH values, are given in Table II.

In all of said drilling mud samples the starch additive used was added in an amount sufficient to give 6 pounds of additive per barrel of starch.

TABLE II

| Run No. | Conc. of Minor Components in Starch Additives, wt. percent | | | Initial | | Aged 4 Days at RT | |
|---|---|---|---|---|---|---|---|
| | $I_2$ | NaI | $H_2O$ | pH | WL, ml. | pH | WL, ml. |
| 1 | 0 | 0 | 0 | 7.7 | 48 | 7.4 | 109 |
| 2a | 0 | 0 | 0 | 8.3 | 29.0 | 8.0 | 70 |
| 3 | 1.5 | 0 | 0 | 7.7 | 11.4 | 7.6 | 84 |
| 4 | 1.5 | 0 | 5 | 8.1 | 11.0 | 8.2 | 66 |
| 5 | 1.5 | 0 | 10 | 7.6 | 13.9 | 8.1 | 34 |
| 6 | 1.5 | 0.06 | 0 | 8.2 | 9.0 | 8.2 | 49 |
| 7 | 1.5 | 0.12 | 0 | 8.2 | 9.9 | 7.6 | 16 |
| 8 | 1.5 | 0.12 | 5 | 8.2 | 16.5 | 8.2 | |
| 9b | 1.5 | 0.12 | 0 | 8.2 | 10.8 | 8.2 | 12.0 | a Starch contained 7.7 wt. percent paraformaldehyde.
b Starch also contained 5 wt. percent methanol.

The above data show the initial water loss from each of the mud samples containing iodine was much less than that from either the non-preserved starch used as a control or the starch preserved with paraformaldehyde. This was a surprising and unexpected result. In general, the water loss of the aged iodine-containing muds remained lower than that of the aged muds containing no iodine. Comparing the water loss results of Runs 4–9 (after aging), wherein the additive contained one of the stabilizing agents used in the practice of the invention, with the water loss results in Run 3, wherein the additive contained no stabilizing agent, shows that the additives of said Runs 4–9 were superior to the additive of said Run No. 3. This was another surprising and unexpected result.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. An aqueous well drilling fluid, comprising: water; sufficient suspended finely divided solids to form a filter cake on the wall of the well; and a small but effective amount of a fluid loss control additive sufficient to improve the fluid loss properties of said drilling fluid but insufficient to increase the viscosity of said drilling fluid to the extent that it cannot be circulated; said additive consisting essentially of a major portion of starch, mixed with from 0.1 to 5 weight percent of iodine, from 0 to 3 weight percent of an alkali metal iodide, and from 0 to 15 weight percent of an additive stabilizing agent selected from the group consisting of water, and water soluble organic solvents which are solvents for iodine, said weight percentages being based on the weight of said starch.

2. An aqueous well drilling fluid comprising a mixture containing: water; sufficient suspended finely divided solids to form a filter cake on the wall of the well; and an amount of a water loss control additive sufficient to reduce the water loss due to filtration through said filter cake but insufficient to increase the viscosity of said drilling fluid to such an extent that it cannot be circulated; said water loss control additive consisting essentially of starch premixed with from 0.1 to 5 weight percent of iodine, from 0 to 3 weight percent of sodium iodide, and from 1 to 15 weight percent of water, said weight percents being based on the weight of said starch.

3. A water base well drilling fluid, comprising a mixture containing: sufficient water to maintain said mixture fluid; sufficient suspended finely divided inorganic solids to form a filter cake on the wall of the well; and a small but effective amount of a water loss control additive sufficient to reduce the water loss due to filtration through said filter cake but insufficient to increase the viscosity of said drilling fluid to the extent that it cannot be circulated; said water loss control additive consisting essentially of a major portion of starch, premixed with from 0.1 to 5 weight percent of iodine, from 0 to 3 weight percent of an alkali metal iodide, and from 0 to 15 weight percent of an additive stabilizing agent selected from the group consisting of water, and water soluble organic solvents which are solvents for iodine, said weight percentages being based on the weight of said starch.

4. A well drilling fluid according to claim 3 wherein said additive contains from 0.5 to 3 weight percent of iodine, said alkali metal iodide is sodium iodide, and said additive stabilizing agent is methyl alcohol present in an amount within the range of from 1 to 15 weight percent.

5. A water base drilling fluid according to claim 4 wherein said sodium iodide is present in an amount within the range of from 0.12 to 3 weight percent.

6. A water base well drilling fluid, comprising a mixture containing: sufficient water to maintain said mixture fluid; sufficient suspended finely divided inorganic solids comprising attapulgite clay to form a filter cake on the wall of the well; and a small but effective amount of a water loss control additive sufficient to reduce the water loss due to filtration through said filter cake but insufficient to increase the viscosity of said drilling fluid to the extent that it cannot be circulated; said water loss control additive consisting essentially of a major portion of starch mixed with about 1.5 weight percent iodine, said weight percent being based on the weight of the starch.

7. A water base well drilling fluid, comprising a mixture containing: sufficient water to maintain said mixture fluid; sufficient suspended finely divided inorganic solids comprising attapulgite clay to form a filter cake on the wall of the well; and a small but effective amount of a water loss control additive sufficient to reduce the water loss due to filtration through said filter cake but insufficient to increase the viscosity of said drilling fluid to the extent that it cannot be circulated; said water loss control additive consisting essentially of a major portion of starch mixed with about 1.5 weight percent iodine, about 0.12 weight percent sodium iodide, and about 5 weight percent methanol, said weight percentages being based on the weight of said starch.

8. An oil-in-water emulsion well drilling fluid comprising an oil-in-water emulsion containing sufficient suspended finely divided inorganic solids to form a filter cake on the wall of the well; a small but effective amount, sufficient to reduce the water loss due to filtration through said filter cake but insufficient to increase the viscosity of said drilling fluid to the extent that it cannot be circulated, starch; and a small but effective amount of iodine sufficient to inhibit the degradation of said starch.

9. A well drilling fluid according to claim 8 wherein said starch is present in an amount within the range of from 0.5 to 15 pounds per barrel of said drilling fluid, and said iodine is present in an amount within the range of from 0.1 to 5 weight percent based on the weight of said starch.

10. An oil-in-water emulsion well drilling fluid comprising a mixture containing: an oil-in-water emulsion; sufficient suspended finely divided inorganic solids to form a filter cake on the wall of the well; and a small but effective amount of a water loss control additive sufficient to reduce the water loss due to filtration through said filter cake but insufficient to increase the viscosity of said drilling fluid to the extent that it cannot be circulated; said water loss control additive consisting essentially of a major portion of starch, premixed with from 0.1 to 5 weight percent of iodine, from 0 to 3 weight percent of an alkali metal iodide, and from 0 to 15 weight percent of an additive stabilizing agent selected from the group consisting of water, and water soluble organic solvents which are solvents for iodine, said weight percentages being based on the weight of said starch.

11. An oil-in-water emulsion well drilling fluid according to claim 10 wherein said additive contains from 0.5 to 3 weight percent of iodine, said alkali metal iodide is sodium iodide present in an amount within the range of from 0.12 to 3 weight percent, and said additive stabilizing agent is methyl alcohol present in an amount within the range of from 1 to 15 weight percent.

12. In a process for the drilling of a well with well drilling tools wherein a drilling fluid is circulated in said well in contact with the walls thereof, the improvement comprising: circulating in said wells as said drilling fluid an aqueous drilling fluid comprising: water; a small but effective amount, sufficient to improve the fluid loss properties of said drilling fluid but insufficient to increase the viscosity of said drilling fluid to the extent that it cannot be circulated, of starch; and a small but effective amount of iodine sufficient to inhibit the degradation of said starch.

13. A process according to claim 12 wherein said starch is present in an amount within the range of from 0.5 to 15 pounds per barrel of said drilling fluid, and said iodine is present in an amount within the range of from 0.1 to 5 weight percent based on the weight of said starch.

14. A process of drilling a well with a rotary bit which comprises forming a bore hole with said bit while circulating through said bit and through said bore hole in contact with the walls thereof a water base drilling fluid comprising a mixture containing: sufficient water to maintain said mixture fluid; sufficient suspended finely divided inorganic solids to form a filter cake on the wall of the well; and a small but effective amount of a water loss control additive sufficient to reduce the water loss due to filtration through said filter cake but insufficient to increase the viscosity of said drilling fluid to the extent that it cannot be circulated; said water loss control additive consisting essentially of a major portion of starch, premixed with from 0.1 to 5 weight percent of iodine, from 0 to 3 weight percent of an alkali metal iodide, and from 0 to 15 weight percent of an additive stabilizing agent selected from the group consisting of water, and water soluble organic solvents which are solvents for iodine, said weight percentages being based on the weight of said starch.

15. A process according to claim 14 wherein said additive contains from 0.5 to 3 weight percent of iodine, said alkali metal iodide is sodium iodide present in an amount within the range of from 0.12 to 3 weight percent, and said additive stabilizing agent is methyl alcohol present in an amount within the range of from 1 to 15 weight percent.

16. A process of drilling a well with a rotary bit which comprises forming a bore hole with said bit while circulating through said bit and through said bore hole in contact with the walls thereof an oil-in-water emulsion drilling mud comprising a mixture containing: an oil-in-water emulsion; sufficient suspended finely divided inorganic solids to form a filter cake on the wall of the well; and a small but effective amount of a water loss control additive sufficient to reduce the water loss due to filtration through said filter cake but insufficient to increase the viscosity of said drilling fluid to the extent that it cannot be circulated; said water loss control additive consisting essentially of a major portion of starch, premixed with from 0.1 to 5 weight percent of iodine, from 0 to 3 weight percent of an alkali metal iodide, and from 0 to 15 weight percent of an additive stabilizing agent selected from the group consisting of water, and water soluble organic solvents which are solvents for iodine, said weight percentages being based on the weight of said starch.

17. A process according to claim 16 wherein said additive contains from 0.5 to 3 weight percent of iodine, said alkali metal iodide is sodium iodide present in an amount within the range of from 0.12 to 3 weight percent, and said additive stabilizing agent is methyl alcohol present in an amount within the range of from 1 to 15 weight percent.

References Cited
UNITED STATES PATENTS

| | | | |
|---|---|---|---|
| 1,925,135 | 9/1933 | Chandler | 167—70 |
| 2,271,695 | 2/1942 | Jones | 252—8.5 |
| 2,417,307 | 3/1947 | Larsen | 252—8.5 |
| 2,908,597 | 10/1959 | Owen | 252—8.5 |
| 2,977,278 | 3/1961 | Shelanski et al. | 167—17 |

OTHER REFERENCES

Lawall et al.: Journal of the American Pharmaceutical Association, vol. XXI, No. 2, February 1932, pp. 122 to 125.

Radley: Starch and Its Derivatives, second edition, published 1944 by D. Van Nostrand Co., Inc., New York, pp. 128 to 134.

Lampitt et al.: Starches and Starch Fractions, article in Society of Chemical Industry Journal, vol. 66, May 1947, pp. 142 to 146.

LEON D. ROSDOL, *Primary Examiner.*

H. B. GUYNN, *Assistant Examiner.*